UNITED STATES PATENT OFFICE.

ARTHUR GEORGE PERKIN, OF LEEDS, ENGLAND, ASSIGNOR TO BRITISH DYESTUFFS CORPORATION, LIMITED, OF KINGSWAY, LONDON, ENGLAND.

MANUFACTURE OF ANTHRANOL.

1,375,972.            Specification of Letters Patent.      Patented Apr. 26, 1921.

No Drawing.      Application filed June 9, 1920. Serial No. 387,730.

*To all whom it may concern:*

Be it known that I, ARTHUR GEORGE PERKIN, of Grosvenor Lodge, Grosvenor Road, Hyde Park, Leeds, England, professor of color chemistry and dyeing in the University of Leeds, have invented certain new and useful Improvements in the Manufacture of Anthranol, of which the following is a specification.

It is well known that anthranol can be obtained from anthraquinone by the action of phosphorus and hydriodic acid, or of finely divided tin in presence of acetic and hydrochloric acids. It has also been proposed to produce anthranol by treating anthraquinone dissolved in sulfuric acid with either aluminium or copper powder.

I have found that anthranol can more conveniently be obtained from anthraquinone by reducing the latter with glucose or a similar carbohydrate and a solution of caustic soda or potash. This reduction may be carried out as shown in the following example.

Example.

60 parts of glucose are dissolved in 650 parts of 28 to 30 per cent. caustic soda solution and 60 parts of finely divided commercial anthraquinone added, the mixture being subsequently heated in a closed vessel provided with stirring gear at 230° C. for 5 to 10 hours. The liquid on having been diluted with water is filtered and the solution acidified with hydrochloric acid, or neutralized with carbonic acid gas, in which case the alkali is recovered. The anthranol obtained then separates out as a pale yellow precipitate, which is collected, washed and dried.

Instead of using glucose in this reduction cane sugar, molasses, maltose, lactose and the like can be used with equally satisfactory results.

What I claim and desire to secure by Letters Patent is:

1. Process for the manufacture of anthranol by heating anthraquinone with a solution of a carbohydrate in the presence of caustic alkali.

2. Process for the manufacture of anthranol by heating anthraquinone with a solution of glucose and caustic soda.

3. Process for the manufacture of anthranol by heating anthraquinone with a solution of glucose and caustic soda in a closed vessel at a temperature of approximately 230 degrees centigrade.

4. Process for the manufacture of anthranol, which consists in heating to a temperature of 230 degrees C., in a closed vessel a mixture of 60 parts of finely divided commercial anthraquinone and a solution of 60 parts of glucose in 650 parts of 28 to 30 per cent. caustic soda, stirring said mixture, diluting the product of the reaction, filtering and separating the anthranol.

In testimony whereof I have signed my name to this specification.

ARTHUR GEORGE PERKIN.